United States Patent [19]

Baker et al.

[11] 3,912,677

[45] Oct. 14, 1975

[54] COMPOUNDS

[75] Inventors: Elizabeth Ann Baker, Glen Iris; David Jankiel Wluka, Balaclava, both of Australia

[73] Assignee: Imperial Chemical Industries of Australia and New Zealand Limited, Melbourne, Australia

[22] Filed: Oct. 23, 1973

[21] Appl. No.: 408,807

Related U.S. Application Data

[63] Continuation of Ser. No. 142,050, May 10, 1971, abandoned.

[30] Foreign Application Priority Data

May 14, 1970 Australia.............................. 1202/70

[52] U.S. Cl....... 260/27 R; 106/308 R; 260/31.2 R; 260/32.8 R; 260/33.2 R; 260/33.4 R; 260/33.6 UA; 260/42.21; 260/874; 260/876 R; 260/881
[51] Int. Cl.²......................................... C08L 93/04

[58] Field of Search...... 260/27 R, 881, 874, 876 R, 260/42.21, 33.6 UA, 33.4 R, 32.8 R, 33.2 R, 31.2 R; 106/308 R

[56] References Cited

UNITED STATES PATENTS

| | | | |
|---|---|---|---|
| 3,159,498 | 12/1964 | Davis | 106/20 |
| 3,317,635 | 5/1967 | Osmond | 260/881 |
| 3,514,500 | 5/1970 | Osmond | 260/23 AR |

Primary Examiner—Melvyn I. Marquis
Attorney, Agent, or Firm—Cushman, Darby & Cushman

[57] ABSTRACT

The invention provides new compounds of use as dispersants for pigments. The compounds comprise a backbone chain having either incorporated in or dependent from it a solubilising group and an ionic group, said ionic group forming a salt with a salt forming component.

20 Claims, No Drawings

COMPOUNDS

This is a continuation, of application Ser. No. 142,050 filed May 10, 1971 and now abandoned.

This invention relates to new polymeric compounds, and to dispersions of pigments in organic liquids containing them.

Dispersions of pigments in liquid organic media comprising solutions or dispersions of film-forming polymer are used as paints, lacquers and printing inks. In these compositions it is desirable that the pigment particles are deflocculated, that is that the particles be present as discrete, individual particles in the liquid organic medium, and should not aggregate.

Frequently when pigments are dispersed in common organic liquids, suspensions are formed exhibiting some degree of aggregation of the pigment particles. Certain materials, fo example soya lecithin and metal soaps of fatty acids, have been proposed as additives to limit pigment flocculation. However in many systems, such as solutions of addition copolymers in organic solvents, satisfactory deflocculated dispersions of pigments cannot be readily prepared. Thus, for example, titanium dioxide pigment forms a highly flocculated dispersion in a solution comprising poly(methyl methacrylate). In particular organic pigments such as copper phthalocyanines and azo pigments are difficult to prepare in a highly deflocculated dispersion in organic media particularly at high solids concentrations.

We have now found certain new polymers which exhibit a highly specific efficacy as dispersants for organic pigments in liquid organic media; in addition they are also effective dispersants for many inorganic pigments.

Accordingly we provide a polymeric dispersant comprising a backbone chain having, incorporated in, or dependent from it, firstly, a solubilising group as hereinafter defined and secondly an ionic group as hereinafter defined, said ionic group forming a salt with a salt forming compound as hereinafter defined.

The function of the backbone chain is essentially that of a supporting structure for the solubilising group and the ionic group. Consequently the nature of the arrangement of the atoms forming the chain is not narrowly critical. Thus the chain may consist of carbon atoms alone, carbon atoms linked with one or more hetero atoms, in particular oxygen, nitrogen, sulphur, phosphorus, silicon and boron; alternatively it may consist of a series of alternating pairs of P-O groups, Si-O groups, Ti-O groups or B-O groups. The backbone may be linear, slightly or highly branched, or crosslinked provided, however, that the resultant polymeric dispersant remains soluble in the organic liquid used in the manufacture of the pigment dispersant. Convenient backbones may be inorganic and, preferably, organic polymer chains; a wide range of polymers is useful as the backbone, the principal limitation being that they must be capable of including a sufficient number both of the solubilising groups and of the ionic groups as hereinafter defined.

The backbone may be formed from addition polymers, e.g. polyalkylenes, which may if desired bear substituents other than those above defined provided these further substituents do not interfere with the solution and salt forming properties of the solubilising groups and of the ionic groups respectively. The type of such further substituents depends on the monomer unit used to build up the backbone. Suitable backbones are the carbon to carbon chains in polystyrene, polyvinyl chloride, polyvinyl alcohol, poly-alpha-beta-ethylenically unsaturated carboxylic acid derivatives particularly substituted and unsubstituted polyacrylates, e.g. polymethyl methacrylate or polyacrylic acid; another group of suitable polymeric backbones are the condensation products of dicarboxylic acids with diols, dicarboxylic acids with diamines, polyurethanes comprising the reaction products of diisocyanates with reactive hydroxyl group containing diols, polyureas, polysulphides, polyimides, polysulphones, polyoxyalkylenes, polyacetals and alkyd resins. As above stated it is, however, understood that the polymeric dispersants derived from said backbones must remain soluble in the organic liquid and that the backbone must be capable of including a plurality of each of the solubilising and ionic groups. The backbones derived from addition polymers may be made by homopolymerisation or copolymerisation.

The solubilising group is characterised by its ability to be solvated by the organic liquid used in the manufacture of the pigment dispersion.

The nature of the organic liquid used in the manufacture of the dispersions of our invention is not critical. The organic liquid normally used in the preparation of conventional dispersions of pigments may be used. Thus suitable organic liquids include saturated hydrocarbons such as aliphatic or alicyclic hydrocarbons; aliphatic oxygen containing organic liquids, for example alcohols, ketones, ethers or esters; and aromatic hydrocarbons. The organic liquid may be used in admixture with one another. A group is usually capable of being solvated if its composition is identical with or chemically closely related to the composition of the organic liquid. A test for selecting suitable solubilising groups is that the compound resulting from conversion of the solubilising group into a separate molecule bearing on the atom bridging it to the backbone a hydrogen atom or a low molecular weight radical, e.g. methyl or acetyl, must be readily soluble in the organic liquid. By "readily soluble" we mean having a solubility in excess of 20% by weight, preferably in excess of 50% by weight, most preferably completely miscible in the organic liquid.

For example, when the organic liquid is a saturated hydrocarbon, suitable solubilising groups, attached to the backbone directly or through linking groups, are substituted or unsubstituted long chain alkyl groups. By "long chain" we mean chains of more than six carbon atoms, e.g. 2-ethylhexyl, dodecyl, hexadecyl or stearyl. A further group of use in hydrocarbon media is condensates of poly(12-hydroxystearic acid).

Alkyl groups are also suitable solubilising groups for aliphatic oxygen containing organic liquids but in this case the alkyl chains should contain more than four carbon atoms.

Additional suitable solubilising groups for use with aliphatic oxygen containing organic liquids, such as, alcohols and ketones, are for example, groups containing polyethers prepared from monomers such as, ethylene oxide propylene oxides or butylene oxides, or are, for example, groups containing alcohols, ketones or derivatives of ketones formed by the reaction of formaldehyde with ketones. These oxygen containing solubilising groups may also be used with aromatic organic liquids. Additional suitable solubilising groups for use with aromatic organic liquids are groups containing aromatically substituted ethylenically unsaturated monomers such as styrene and vinyl toluene.

The above examples illustrate suitable solubilising groups but do not limit the scope of the invention.

While we do not wish to be bound by theoretical considerations it is thought that the polymeric dispersants are effective because the salt forming component is of a similar nature to the surface of the pigment particles to be dispersed. The salt forming component causes the polymeric dispersant to become associated with the surface of the pigment particles, possibly the Van der Waals forces, and thus prevents the pigment particles from flocculating. Salt forming components are therefore compounds capable of reaction with the ionic group as hereinafter defined and having a structure similar to that of the surface of the pigment particles.

Suitable salt forming components, to form polymeric dispersants for use with a specific pigment, may be derived from that pigment by substituting the pigment molecule with an ionic radical. For example, suitable salt forming components may be obtained from the specific pigment to be dispersed by substituting, for one or more hydrogen atoms, a radical such as sulphonic, phosphoric, carboxylic, amino, alkylamino, ammonium, phosphonium or sulphonium. The salt forming component may also be an ionic intermediate in the manufacture of the pigment.

Suitable salt forming components for those pigments known in the art as rosinated pigments, are wood rosin and related polymeric or hydrogenated rosins. Additional suitable salt forming components for rosinated pigments are sulphonated aromatic hydrocarbons and the low molecular weight polymeric derivatives obtained by the condensation of sulphonated aromatic hydrocarbons with aldehydes and ketones. Salt forming components suitable for rosinated pigments are therefore, for example dehydro abietic acid, abietic acid, cholic acid, desoxycholic acid, cholanic acid, 12-ketocholanic acid. Suitable salt forming components for pigments known in the art as toners and lake pigments, either rosinated or unrosinated are naphthalene sulphonic acids; benzene sulphonic acids; anthracene and phenanthrene sulphonic acids; and formaldehyde condensate of naphthalene-2-sulphonic acid.

The ionic group in the polymeric dispersant may be either acidic or basic. Suitable acidic groups are, for example, carboxylic, sulphonic or phosphoric groups. Suitable basic groups are for example primary, secondary or tertiary amine, ammonium, phosphonium or sulphonium groups.

The ionic group may also be an internal salt in which case the salt forming component must be either a strong enough acid or base to react with the internal salt by an ion exchange process giving a polymeric dispersant containing free basic or acidic groups respectively.

The polymer, comprising the backbone chain having incorporated in or dependent from it separately a solubilising group and an ionic group, may be prepared by methods well known in the art. It is often convenient to make the backbone chain by polymerising or, in the case of addition copolymers, by copolymerising, the mer-units of the polymer which bear sites capable of reacting with one or both of the desired types of substituents; alternatively the mer-units of the polymer may already bear a suitable solubilising group or a suitable ionic group prior to polymerisation. Conventional addition polymerisation initiators, chain transfer agents and techniques including, for example, skew feeding of monomers, may be used. It is convenient to carry out the polymerisation in the presence of a solvent for the polymer.

The molecular weight of the polymer lies between 2,000 and 500,000 preferably between 5,000 and 100,000.

When the polymer is prepared by the polymerisation of a mixture of co-mers comprising a co-mer containing the solubilising group or to which the solubilising group may be later attached and a co-mer containing an ionic group or to which an ionic group may be later attached, the solubilising co-mers should predominate in the mixture of co-mers. The molar percentage in the mixture of the co-mers containing the solubilising group or groups or to which the solubilising group or groups may be later attached should preferably be between 99 and 50. The molar percentage in the mixture of the co-mers containing the ionic group or groups or to which the ionic group or groups may be later attached should preferably be between 1 and 50.

The new compounds may be prepared from the polymer and the salt forming component.

Accordingly we provide a process of making a polymeric dispersant which process comprises reacting a polymer comprising a backbone chain having, incorporated in, or dependent from, it firstly, a solubilising group as hereinbefore defined and secondly, an ionic group as hereinbefore defined, with a salt forming component as hereinbefore defined.

Complete reaction of the ionic groups in the polymer with the salt forming component is not necessary and we prefer the percentage of ionic groups reacting to form a salt to be from 10 to 100% inclusive.

The polymeric dispersants are used as deflocculating agents in suspensions of pigment particles in organic liquids.

Accordingly we also provide a dispersion of pigment particles comprising firstly a pigment, secondly, an organic liquid, thirdly, a polymeric dispersant as hereinbefore defined and fourthly, optionally, water.

While our dispersions may be made in the absence of water, we prefer that some water is present.

The percentage weight for weight of water in the mixture is preferably a number between 0.05 and 5 inclusive and is more preferably a number between 0.5 and 2 inclusive. When the dispersions are prepared from undried materials they will normally contain sufficient water but if dried materials are used water may be added with advantage to bring the w/w percentage of water in the dispersion to within our preferred range. The efficiency of the polymeric dispersant sometimes improves if the dispersion is kept standing for several hours.

The dispersions are prepared by grinding the pigment, preferably under conditions of high-speed mechanical milling, in an organic liquid and with polymeric dispersant.

Accordingly we provide a process of making a dispersion of a pigment, which process comprises grinding a mixture comprising an effective amount of polymeric dispersant, a pigment, organic liquid and optionally water.

An alternative method of preparing dispersions is to manufacture the dispersing agent in situ in the dispersion.

Accordingly we provide a process of making a dispersion of a pigment which process comprises grinding a mixture comprising: a polymer comprising a backbone chain having incorporated in, or dependent from, it firstly, a solubilising group as hereinbefore defined and secondly, an ionic group as hereinbefore defined; a salt forming component as hereinbefore defined, suitable pigment, an organic liquid, optionally water and optionally an inorganic base.

In this process the amounts of polymer and salt forming component are sufficient to form the dispersing agent as hereinbefore defined. The ratio of polymer to salt forming component lies in the range from 1:1 to 10:1. Up to 30% w/w water may be present in the dispersion without adverse effect; however, we prefer the amount of water present in the pigment dispersion to be less than 10% w/w. In some cases an inorganic base such as, for example, an alkaline earth, or alkali, metal hydroxide may be added with advantage in amounts sufficient to neutralise the salt forming component.

The maximum concentration of polymeric dispersant to be used is not critical, although as a rule it is not economical to use an excess over that required for a particular application. The minimum concentration is, at least in part, related to the specific surface area of the pigment. The actual — optimal or most economical — amount of polymeric dispersant to be used with a particular pigment/organic liquid system is readily determined by simple experiment. Incremental additions of polymeric dispersant are made to the system until the desired level of deflocculation is attained. The invention is not limited to the preparation of fully defloculated dispersions as for many purposes it is not necessary nor economically desirable to prepare a fully defloculated system.

The dispersions of this invention are of use, for example, as concentrated tinting bases for paints and printing inks. For this application we prefer to use polymeric dispersants in which the concentration of ionic groups approaches the upper limit of our preferred range. It is a particular advantage of our invention that these polymeric dispersants are usually compatible with a wide range of vehicles used in the manufacture of paints and printing inks, thus providing unusually versatile tinting bases; in addition they provide a convenient route to the preparation of defloculated pigment dispersions in solutions of addition polymers in organic liquids. The concentration of pigment in certain cases may be as much as 40–60% by volume; consequently our invention affords an increase in production capacity of dispersing equipment and the dispersions require less space for storage.

In a further embodiment of our invention using a film-forming polymeric dispersant, the polymeric dispersant may provide the whole or part of the film-forming polymer of a paint. That is, a dispersion of pigment in an organic liquid and polymeric dispersant, optionally in the presence of a minor proportion of additional film-forming polymer, when applied as a film to substrate and allowed to dry in air, forms on the substrate a coherent decorative and/or protective coating. In this application we have found it preferable to use low concentrations, i.e. approaching the minimum concentration limit, of ionic groups in the polymeric dispersant, which is itself used in the dispersion in relatively high proportions, for example the pigment volume concentration based on the total solids content of the dispersion may be from 8 to 25% and the polymeric dispersant volume concentration based on the total solids content may be as high as 92%.

In a further embodiment of our invention we have found that pigment particles coated with the polymeric dispersing agent of our invention have the advantage of imparting improved flow properties to printing inks incorporating them compared to inks made with uncoated pigment particles.

Accordingly we provide coated pigment particles comprising pigment particles having surface coatings of a polymeric dispersant for the pigment as hereinbefore described.

We also provide a process of manufacturing coated pigment particles which process comprises mixing together a pigment with a polymeric dispersant.

We also provide an alternative process of manufacturing coated pigment particles which process comprises reacting a mixture comprising a pigment with a salt forming component as hereinbefore defined and a polymer comprising a backbone chain having incorporated in, or dependant from, it firstly, a solubilising group as hereinbefore defined and secondly an ionic group as hereinbefore defined.

We provide a still further alternative process of manufacturing coated pigment particles which process comprises adding a polymeric dispersant for the pigment at some stage in the manufacture of the pigment.

The amount of polymeric dispersing agent coated onto the pigment is not narrowly critical. We have found that proportions from 1% w/w to 30% w/w of dispersant to total pigment composition are satisfactory. Preferably the proportion of dispersing agent to total pigment composition is from 5% w/w to 20% w/w.

Our invention is now illustrated but in no way limited by the following examples, in which all parts are given by weight unless otherwise specified.

EXAMPLE 1

A mixture of dimethylaminoethyl methacrylate (374 parts), benzyl chloride (300 parts), n-propanol (700 parts) and "Topanol" A (Registered Trade Mark of Imperial Chemical Industries Limited for 2,6-ditertbutyl-4-methylphenol) (2.1 parts) was added to a stirred reaction vessel fitted with a reflux condenser. The stirred mixture was heated under reflux for one hour and allowed to cool. A mixture of 2-ethylhexyl acrylate (3506 parts), azodiisobutyronitrile (41 parts), acetone (200 parts) and n-propanol (500 parts) was added with stirring and the resultant mixture was then added over 3 hours to a mixture of toluene (4000 parts) and n-propanol (4800 parts) in a reaction vessel heated under reflux, with stirring. To the mixture heated under reflux with stirring three additional portions of azodiisobutyronitrile (6 g) were added at three-hourly intervals. After a further three hours the polymerisation was substantially complete. The n-propanol was removed by azeotropic distillation with toluene (20,000 parts). 2N aqueous sodium hydroxide solution (40 parts) and finely ground rosin (36 parts) were added simultaneously to a mixture of water (1000 parts) and 2N aqueous sodium hydroxide solution (30 parts) at 70°C. The clear solution obtained, of pH 10, was cooled and added to the polymer solution prepared above. The mixture was heated under reflux for one hour. The water was removed by azeotropic distillation and then toluene was removed until the polymer content of the residue was 30% w/w. The mixture was filtered to remove inorganic material and the filtrate was used as polymeric dispersant 1A.

EXAMPLES 2 TO 6 INCLUSIVE

The method of Example 1 was repeated in Examples 2 to 6 to prepare polymeric dispersants 2A to 6A respectively except that the proportions and nature of the ingredients were changed as tabulated in Table I. In Example 2 the polymer was quaternised with dimethyl sulphate after the copolymerisation stage and then neutralised with aqueous calcium hydroxide solution. The products formed, and the ingredients and proportions used, are tabulated in Table I.

Notes on Table I
1. 2EHA:DMAEM-BC is the polymer formed by copolymerising 2-ethylhexyl acrylate (co-mer containing a solubilising group) and the quaternary salt of dimethyl aminoethyl methacrylate and benzyl chloride (co-mer containing an ionic group).
2. 2EHA:4VP-MS is the methyl sulphate quaternary salt of the polymer formed by copolymerising 2-ethylhexyl acrylate (co-mer containing the solubilising group) and 4-vinylpyridine (co-mer containing a group which can be quaternised to form the ionic group).
3. '% salt formation' is the molar equivalent percentage of salt forming component to polymer.

nated copper phthalocyanine paste (1310 parts) (containing 1.25 —$SO_3H$ groups per molecule of copper phthalocyanine) and water (6000 parts) was titrated with 10N sodium hydroxide to pH 9 with thorough mixing to form a solution. This copper phthalocyanine solution was added to the reaction mixture prepared above and the total mixture was heated under reflux for 1 hour. Water was removed by azeotropic distillation then toluene removed and replaced with "Boralene" 1127 to produce a solution containing 30% polymer. The solution was filtered to remove solid impurities and the filtrate was used as polymeric dispersant 7A.

EXAMPLES 8 TO 13 INCLUSIVE

Polymeric dispersants 8A to 13A were prepared in Examples 8 to 13 respectively using the same method as Example 7 except that the proportions of 2-ethylhexyl acrylate, dimethylaminoethyl methacrylate, benzyl chloride and sulphonated copper phthalocyanine were changed. The products formed, and the ingredients and proportions used, are tabulated in Table II.

Notes on Table II
1. 2EHA:DMAEM-BC has the same significance as used in Table I.
2. '% salt formation' is the molar equivalent percentage of sulphonated phthalocyanine to the ionic groups in the polymer.
3. 'Ratio of co-mers in the polymer' is the molar ratio of the co-mer containing the solubilising group to the co-mer containing the ionic group.

TABLE I

| Ex. | Polymer | Ratio of co-mers in polymer on a molar basis | Salt forming component | % Salt formation | Polymeric dispersant |
|---|---|---|---|---|---|
| 1 | 2EHA : DMAEM-BC | 8 : 1 | Rosin | 50 | 1A |
| 2 | 2EHA : 4VP-MS | 9 : 1 | Rosin | 100 | 2A |
| 3 | 2EHA : DMAEM-BC | 8 : 1 | Cholic acid | 50 | 3A |
| 4 | 2EHA : DMAEM-BC | 8 : 1 | "Dispersol" LN* | 50 | 4A |
| 5 | 2EHA : DMAEM-BC | 8 : 1 | "Polypale"** | 75 | 5A |
| 6 | 2EHA : DMAEM-BC | 8 : 1 | "Stabylite"*** | 30 | 6A |

*"Dispersol" LN is a Registered Trade Mark for a formaldehyde condensate of napthalene sulphonic acid
**"Polypale" is a Registered Trade Mark for polymerised rosin
***"Stabylite" is a Registered Trade Mark for hydrogenated polymerised rosin

EXAMPLE 7

A mixture of dimethylaminoethyl methacrylate (72.2 parts), benzyl chloride (58.0 parts) n-propanol (130 parts) and "Topanol" A (0.4 parts) was heated under reflux in a stirred reaction vessel for 1 hour and then the mixture was cooled. A mixture of 2-ethylhexyl acrylate (283 parts), azodiisobutyronitrile (4.0 parts), acetone (20 parts) and n-propanol (50 parts) was added with stirring and this mixture was then added to a solution of toluene (455 parts) and n-propanol (275 parts) heated under reflux. The mixture was added slowly over three hours. Three additional portions (0.8 parts) of azodiisobutyronitrile were added at 3-hourly intervals to the mixture heated under reflux. After a further 3 hours the polymerisation was substantially complete. The n-propanol was removed by azeotropic distillation with toluene and the solution diluted with toluene (1000 parts). A mixture of 18.2% w/w aqueous sulpho- 4. S-CPC is sulphonated copper phthalocyanine.

TABLE II

| Ex. | Polymer | Ratio of co-mers in polymer | % salt formation | pH of aqueous S-CPC solution | Polymeric dispersant |
|---|---|---|---|---|---|
| 7 | 2EHA:DMAEM-BC | 3.4 : 1 | 77 | 9 | 7A |
| 8 | 2EHA:DMAEM-BC | 8 : 1 | 27 | 9 | 8A |
| 9 | 2EHA:DMAEM-BC | 10 : 1 | 60 | 7 | 9A |
| 10 | 2EHA:DMAEM-BC | 11 : 1 | 24 | 9 | 10A |
| 11 | 2EHA:DMAEM-BC | 11 : 1 | 40 | 9 | 11A |
| 12 | 2EHA:DMAEM-BC | 11 : 1 | 80 | 9 | 12A |
| 13 | 2EHA:DMAEM-BC | 11 : 1 | 100 | 7 | 13A |

EXAMPLE 14

Polymeric dispersant 14A was made by the method of Example 7 except that instead of using an aqueous solution of sulphonated copper phthalocyanine, the polymer solution in toluene was treated with a solution of the sodium salt (82 parts) of the product formed by coupling the diazo salt of 2B Acid (2-chloro-4-aminotoluene-5-sulphonic acid) with BON Acid (2-hydroxynaphthalene-3-carboxylic acid) in water (820 parts). The total mixture was heated under reflux for 2 hours. Water was removed by azeotropic distillation with toluene and excess toluene was removed until a solution was obtained containing 30% w/w polymeric material. The solution was filtered to remove solid impurities and the filtrate was used as polymeric dispersant 14A.

EXAMPLE 15

Polymeric dispersant 15A was made by the method of Example 7 except that instead of using an aqueous solution of sulphonated copper phthalocyanine, the polymer solution in toluene was treated with a solution of "Coomassie Yellow" 7GS (Trade Mark of Imperial Chemical Industries Limited for a dyestuff with Colour Index No. 23900) (138 parts) in water (1380 parts). The mixture was heated under reflux for 3 hours. Water was removed by azeotropic distillation with toluene then the toluene was removed and replaced with "Boralene" 1127 to produce a solution containing 30% w/w polymeric material. The solution was filtered to remove solid impurities and the filtrate was used as polymeric dispersant 15A. "Boralene" 1127 is a Trade Mark for a petroleum distillate containing about 30% aromatics and boiling point range 42°–114°C.

EXAMPLE 16

Polymeric dispersant 16A was made by the method of Example 15, except that a solution of 274 parts of "Coomassie" Yellow 7GS in 2740 parts of water was used in place of the "Coomassie" Yellow solution used in that example.

The final solution contained 30% w/w polymeric material and was used as polymeric dispersant 16A.

EXAMPLE 17

The polymeric dispersants 1A to 16A prepared in Examples 1 to 16 and polymeric dispersant 20A prepared in Example 20 were used as deflocculating agents for various types of pigment. Individual pigments were mixed with a hydrocarbon solvent, and in certain instances water, and the resultant mixture was treated with one of our polymeric dispersants. The amounts and types of ingredients used are set out in recipes 1 to 6 below.

Recipe 1. "Philblack"55 (35 g), polymeric dispersant (11.7 g) and toluene (53.3 g).
Recipe 2. "Austiox" (80 g), polymeric dispersant (4 g) and toluene (16 g).
Recipe 3. "Monastral" Fast Blue BGA (35 g), polymeric dispersant (23.4 g), "Boralene" 1127 (39.6 g) and water (2 g).
Recipe 4. "Monastral" Fast Blue RFA (35 g), polymeric dispersant (23.4 g), "Boralene" 1127 (39.6 g) and water (2 g).
Recipe 5. Rubine Toner 2BA (35 g), polymeric dispersant (11.7 g) and toluene (53.3 g).
Recipe 6. "Monolite" Yellow GTA (20 g), polymeric dispersant (13.3 g), "Boralene" 1127 (64.7 g) and water (2 g).
Recipe 7. polymeric dispersant (20 g), "Boralene" 1127 (48 g) and water (2 g), "Monolite" Yellow GTA (30 g).

"Monastral", "Monolite" are Registered Trade Marks of Imperial Chemical Industries Limited and "Philblack" is a Trade Mark of Phillips Petroleum Company; "Boralene" is a Trade Mark of Boral Limited; "Austiox" is a Trade Mark of Australian Titan Products.

The pigment dispersions were prepared from the mixture described in recipes 1 to 7 by grinding the mixture of ingredients together with 150 g of 4 mm glass beads in a jar on a paint conditioner for 30 minutes.

The dispersions were then visually examined and rated from 0 to 10 according to their viscosity, this being taken as a measure of deflocculation of the system. A rating of 0 meant that the dispersion was no better than a control dispersion containing no dispersant. A rating of 10 in each case represented a fluid dispersion which would flow easily.

The ratings of the dispersions prepared using recipes 1 to 7 and polymeric dispersants 1A to 16A and 20A are given in Table III. For comparison control dispersions were prepared using recipes 1 to 7 but with the omission of the polymeric dispersant. The ratings of the control dispersions are also given in Table III.

TABLE III

| Polymeric Dispersant | Recipe 1 | Recipe 2 | Recipe 3 | Recipe 4 | Recipe 5 | Recipe 6 | Recipe 7 |
|---|---|---|---|---|---|---|---|
| Control | 0 | 0 | 0 | 0 | 0 | 0 | 0 |
| 1A | 10 | 10 | 3 | 10 | 8 | 3 | — |
| 2A | — | — | 3 | — | 7 | 3 | — |
| 3A | — | — | 3 | — | 8 | 3 | — |
| 4A | — | — | 3 | — | 8 | 3 | — |
| 5A | — | — | 3 | — | 8 | 3 | — |
| 6A | — | — | 3 | — | 8 | 3 | — |
| 7A | 10 | 10 | 4 | — | 3 | 3 | — |
| 8A | — | — | 6 | — | 3 | 3 | — |
| 9A | — | — | 8 | — | 3 | 3 | — |
| 10A | — | — | 8 | — | 3 | 3 | — |
| 11A | — | — | 10 | 10 | 3 | 3 | — |
| 12A | — | — | 10 | — | 3 | 3 | — |
| 13A | — | — | 10 | — | 3 | 3 | — |
| 14A | — | — | 3 | — | 10 | 3 | — |
| 15A | — | — | 3 | 3 | 3 | 5 | — |
| 26A | — | — | 3 | 3 | 3 | 8 | — |
| 20A | — | — | — | — | — | 10 | 10 |

EXAMPLE 18

This example shows the effect of not adding water to a dispersion of "Monastral" Fast Blue BGA.

A dispersion of "Monastral" Fast Blue BGA was prepared exactly as described in Example 17 using recipe 3 and polymeric dispersant 9A except that the 2 g of water was omitted. The rating of the polymeric dispersant 9A dropped from 8 to 3.

EXAMPLE 19

This example shows the effect of standing the dispersion for twelve hours.

A dispersion of "Monastral" Fast Blue BGA and polymeric dispersant 10A was prepared exactly as described in Example 17 using recipe 3. On standing the dispersion for 12 hours the rating of the polymeric dispersant 10A increased from 8 to 10.

EXAMPLE 20

Polymeric dispersant 20A was made by the method of Example 7 except that instead of using an aqueous solution of sulphonated copper phthalocyanine the polymer solution in toluene was heated with a 15.5% w/w aqueous paste (1395 parts) formed by coupling diazotised 3,3'-dichlorobenzidine with sodium acetoacetanilide-p-sulphonate. The total mixture was heated under reflux for 2 hours. Water was removed by azeotropic distillation with toluene, and then toluene was removed and replaced with "Boralene" 1127 to produce a solution containing 30% w/w polymeric material. The solution was filtered to remove solid impurities and the filtrate was used as polymeric dispersant 20A.

EXAMPLE 21

A mixture of dimethylaminoethyl methacrylate (157 parts), benzyl chloride (126 parts), n-propanol (280 parts) and "Topanol" A (0.12 parts) was added to a stirred reaction vessel fitted with a reflux condenser. The stirred mixture was heated under reflux for one hour and allowed to cool. A mixture of 2-ethylhexyl acrylate (552 parts), azodiisobutyronitrile (8.3 parts), acetone (110 parts) and n-propanol (300 parts) was added with stirring and the resulting solution was then added over 3 hours to a mixture of toluene (1000 parts) and n-propanol (500 parts) in a reaction vessel heated under reflux, with stirring. Three additional portions of azodiisobutyronitrile (1.6 part) were added at three hourly intervals to the mixture heated under reflux with stirring. After a further three hours the polymerisation was substantially complete. The n-propanol was removed by azeotropic distillation with toluene, then the toluene was removed and replaced with "Boralene" 1127 to produce a solution containing 30% w/w polymeric material. The solution was used as polymer 21A.

EXAMPLES 22 TO 27 INCLUSIVE

The method of Example 21 was repeated in Examples 22 to 27 to prepare polymers 22A to 27A respectively except that the proportions and nature of the ingredients were changed as tabulated in Table IV.

TABLE IV

| Example | Polymer | Ratio of co-mers in polymer on a molar basis | Polymer |
|---|---|---|---|
| 21 | 2EHA:DMA-EM-BC | 3:1 | 21A |
| 22 | '' | 8:1 | 22A |
| 23 | '' | 10:1 | 23A |
| 24 | '' | 20:1 | 24A |
| 25 | '' | 30:1 | 25A |
| 26 | '' | 50:1 | 26A |
| 27 | '' | 80:1 | 27A |

EXAMPLE 28

Dimethyl sulphate (43.2 parts) was added slowly to a mixture of 2-methylthioethyl acrylate (50 parts) and benzene (50 parts) in a stirred reaction vessel fitted with reflux condenser. The mixture was stirred at room temperature for one hour and the resultant sulphonium salt separated out as a while solid and was removed by filtration. A portion of this product (48.3 parts), n-propanol (150 parts), 2-ethylhexyl acrylate (331 parts), methacrylic acid (25.8 parts) azodiisobutyronitrile (6.0 parts) and acetone (20.0 parts) were mixed and added to a stirred refluxing solution of toluene (420 parts) and n-propanol (370 parts) over 3 hours. Three further portions (1.0 part) of azodiisobutyronitrile were added at three hourly intervals. After an additional three hours the polymerisation was substantially complete. The solvents were then removed and the polymer redissolved in "Boralene" 1127 to yield a 30% w/w solution which was used as polymer 28A.

EXAMPLE 29

Two solutions were prepared, one containing 2-ethylhexyl acrylate (92 parts), azodiisobutyronitrile (1.0 part) and acetone (5.0 parts) and a second solution containing allyltriphenylphosphonium bromide (7.6 parts) and n-propanol (85 parts). Each solution was added separately at an equal rate over three hours to a stirred refluxing solution of toluene (70 parts) and n-propanol (45 parts).

Four further portions (0.2 parts) of azodiisobutyronitrile were added at three hourly intervals. After a further 3 hours polymerisation was substantially complete. The solvents were then removed and replaced with "Boralene" 1127 to yield a 30% w/w polymer solution which were used as polymer 29A.

EXAMPLE 30

The polymers 21A – 29A prepared in Examples 21 to 29 were used to prepare dispersions of various pigments by grinding the pigment with polymer, a salt forming component and in cases where the latter is acidic, inorganic base, and in certain cases added water. Grinding was carried out as in Example 17. Ingredients used in each case are given in Tables V–VII. Each dispersion was made up to 100 parts with "Boralene" 1127.

Each dispersion was visually examined and rated as in Example 17. These ratings are given in Tables V, VI and VII.

TABLE V

| Parts Monastral Fast Blue BGA | Polymer No. | Parts | Parts of "S-CPC" Paste | Parts (ml) NaOH (1 N solution) | Rating |
|---|---|---|---|---|---|
| 35 | 21A | 23 | 5.2 | 0.84 | 9½ |
| 35 | 22A | 23 | 6.2 | 1.00 | 10 |
| 35 | 23A | 23 | 9.8 | 1.66 | 10 |
| 35 | 24A | 23 | 5.3 | 0.88 | 10 |
| 35 | 26A | 23 | 4.5 | 0.74 | 9 |
| 35 | 26A | 23 | 4.5 | 0.00 | 10 |
| 35 | 27A | 23 | 2.9 | 0.46 | 6 |
| 35 | 28A | 23 | 15.0 | 2.60 | 4 |
| 35 | 29A | 23 | 10.8 | 1.76 | 5 |

The "S-CPC" paste used was a 18.0% w/w aqueous solution of sulphonated copper phthalocyanine containing 1.28 —SO$_3$H groups per molecule of phthalocyanine.

TABLE VI

| Parts Rubine Toner 2BA | Polymer No. | Parts | Parts of dried "2BA dyestuff" | Parts Water | Rating |
|---|---|---|---|---|---|
| 35 | 24A | 23 | 1.0 | 1.0 | 10 |
| 35 | 23A | 23 | 2.0 | 1.0 | 8 |

The "2BA dyestuff" used was the product formed by coupling the diazo salt of 2-chloro-4-aminotoluene-5-sulphonic acid with 2-hydroxy-3-naphthoic acid.

TABLE VII

| Parts Monolite Yellow GLA | Polymer No. | Parts | Parts "Yellow Dyestuff" paste | Rating |
|---|---|---|---|---|
| 30 | 22A | 20 | 9.2 | 9 |
| 30 | 22A | 20 | 4.6 | 10 |
| 30 | 25A | 20 | 5.5 | 10 |

The "yellow dyestuff" paste used was a 15.5% w/w aqueous solution of the product formed by coupling diazotised 3,3'-dichloro benzidine with sodium acetoacetanilide-p-sulphonate.

EXAMPLE 31

This example demonstrates how a polymeric dispersant may be made and coated onto a pigment during the manufacture of the latter in one operation.

Beta copper phthalocyanine powder (100 parts) was treated as described in Example 1 of Australian application No. 24497/67 except that the caustic soda solution used to make the pigment suspension alkaline contained the polymer prepared in Example 23 (29.4 parts of 30% w/w solution in n-propanol) and sulphonated copper phthalocyanine (13.74 parts of a 18.0% w/w aqueous paste (containing 1.28 —$SO_3H$ groups per molecule of phthalocyanine)).

The pigment produced showed an improvement in flow properties when incorporated into viscous and liquid inks.

EXAMPLE 32

This example demonstrates how a polymeric dispersant, made separately, may be coated onto a pigment during manufacture of the latter.

Thus, acetoacet-m-4-xylidide (32 parts) was stirred in water (600 parts) at a slightly acid pH. Polymeric dispersant 20A prepared in Example 20 (14.4 parts of 30% w/w solution in n-propanol) was added with stirring. 3,3'-dichlorobenzidine (19 parts) was diazotized and added slowly while maintaining the same slightly acidic conditions. The pigment suspension was then heated, filtered, washed and dried.

This pigment showed an improvement in flow properties when incorporated into a liquid ink.

EXAMPLE 33

A typical gravure ink was made up using a 35% w/w dispersion of "Monastral" Fast Blue BGA in "Boralene" 1127 which was made using the recipe in Table V and polymer 25A. The dispersion was ground until the average particle size was under one micron. Thus, a portion of the above dispersion (10 parts) was slowly added to a 60% w/w zinc rosinate solution in "Boralene" 1127 (64 parts) while stirring with a high speed mixer. After thorough mixing "Boralene" 1127 (26 parts) was added. This ink was then drawn down on paper and compared with drawdown made using a standard ink consisting of "Monastral" Fast Blue BGA (3.5 parts) and a 40% w/w zinc rosinate solution in "Boralene" 1127 (96.5 parts). Compared with the standard ink the ink made using dispersant 25A was brighter and had about 20% more colour development.

We claim:

1. A polymeric dispersant for dispersing organic pigment particles in an organic liquid, said dispersant being an addition copolymer having a molecular weight of 2,000 to 500,000 and being a copolymer obtained by copolymerization of a mixture of (i) 99 to 50 molar percent of an ethylenically unsaturated monomer containing at least one solubilizing group which is soluble to the extent of at least 20% by weight in said organic liquid, and (ii) 1 to 5 molar percent of an ethylenically unsaturated monomer containing at least one ionic acidic or basic group capable of forming a salt by reaction with a salt-forming component containing a complementary basic or acidic group and having a structure similar to that of the surface of the pigment particles.

2. A polymeric dispersant, for dispersing an organic pigment, according to claim 1 wherein the salt-forming component is the pigment molecule substituted with an ionic radical.

3. A polymeric dispersant, for dispersing an organic pigment, according to claim 2 wherein the pigment molecule is substituted with a radical selected from the group consisting of sulphonic, phosphoric, carboxylic, amino, alkylamino, ammonium, phosphonium or sulphonium.

4. A polymeric dispersant, for dispersing an organic pigment, according to claim 1 wherein the salt-forming component is an ionic intermediate in the manufacture of the pigment.

5. A polymeric dispersant, for dispersing a resinated pigment, according to claim 1 wherein the salt-forming component is selected from the group consisting of dehydro abietic acid, abietic acid, cholic acid, desoxycholic acid, cholanic acid, 12-keto cholanic acid.

6. A polymeric dispersant, for dispersing a toner or a lake pigment either rosinated or unrosinated, according to claim 1 wherein the salt-forming component is selected from the group consisting of naphthalene sulphonic acids; benzene sulphonic acids; anthracene and phenanthrene, sulphonic acids and formaldehyde condensates of naphthalene-2-sulphonic acid.

7. A polymeric dispersant, for dispersing a pigment, according to claim 1 wherein the ionic group is selected from the group consisting of carboxylic, sulphonic, phosphonic, primary, secondary and tertiary amino, ammonium, phosphonium and sulphonium groups.

8. A polymeric dispersant, for dispersing a pigment in aliphatic or aromatic hydrocarbon media, according to claim 1 wherein the solubilising group is an alkyl group containing from 8 to 20 inclusive carbon atoms.

9. A polymeric dispersant, for dispersing a pigment in aliphatic or aromatic hydrocarbon media, according to claim 1 wherein the solubilising group is either phenyl or benzyl.

10. A polymeric dispersant according to claim 1 for dispersing a pigment in aliphatic oxygen containing organic liquids wherein the solubilising group is a condensate of an alkylene oxide.

11. A polymeric dispersant according to claim 10 wherein the alkylene oxide contains from 2 to 4 inclusive carbon atoms.

12. A polymeric dispersant, for dispersing a pigment, according to claim 1 having a molecular weight between 5,000 and 100,000.

13. A polymeric dispersant, for dispersing a pigment, according to claim 1 wherein the percentage of ionic groups reacted with salt-forming components is from 10 to 100.

14. A process of manufacturing the polymeric dispersant of claim 1 which process comprises reacting a polymer comprising the backbone chain having incorporated in, or dependent from, it, firstly, a solubilising group and secondly, an ionic group, with the salt-forming component.

15. A dispersion of a pigment comprising firstly a pigment, secondly an organic liquid, thirdly a polymeric dispersant, for the pigment, as defined by claim 1.

16. A dispersion according to claim 15 comprising between 0.05 and 5% w/w of water.

17. A dispersion according to claim 16 comprising between 0.5 and 2% of water.

18. Coated pigment particles comprising pigment particles having surface coatings of a polymeric dispersant, for the pigment, of claim 1.

19. Coated pigment particles according to claim 18 comprising between 1 and 30% w/w of polymeric dispersant.

20. Coated pigment particles according to claim 18 comprising between 5 and 20% w/w of polymeric dispersant.

* * * * *